(12) United States Patent
Sato et al.

(10) Patent No.: US 6,257,384 B1
(45) Date of Patent: Jul. 10, 2001

(54) TWO-WAY DIFFERENTIAL CLUTCH

(75) Inventors: Koji Sato; Masao Komuro, both of Shizuoka; Masaaki Saiko, Aichi, all of (JP)

(73) Assignees: NTN Corporation, Osaka; Aichi Kikai Kogyo Kabushiki Kaisha, Aichi, both of (JP)

( * ) Notice: Subject to any disclaimer, the term of this patent is extended or adjusted under 35 U.S.C. 154(b) by 0 days.

(21) Appl. No.: 09/492,185

(22) Filed: Jan. 27, 2000

(30) Foreign Application Priority Data

Jan. 28, 1999 (JP) .................................. 11-019791
Aug. 10, 1999 (JP) .................................. 11-226024

(51) Int. Cl.[7] ............................ F16D 41/10; F16D 43/02
(52) U.S. Cl. ............................................. 192/37; 192/43.1
(58) Field of Search .................... 192/35, 37, 43, 192/43.1; 180/248, 249

(56) References Cited

U.S. PATENT DOCUMENTS

| | | | |
|---|---|---|---|
| 4,997,074 | * | 3/1991 | Larson et al. .................... 267/161 X |
| 5,025,902 | * | 6/1991 | Imai et al. ........................... 192/43 |
| 5,848,679 | * | 12/1998 | Saiko et al. .......................... 192/37 |
| 6,026,942 | * | 2/2000 | Saiko et al. .......................... 192/37 |

FOREIGN PATENT DOCUMENTS 9-25959    1/1997 (JP) .

* cited by examiner

*Primary Examiner*—Richard M. Lorence
(74) *Attorney, Agent, or Firm*—Wenderoth, Lind & Ponack, L.L.P.

(57) ABSTRACT

A two-way differential clutch is provided which can prevent the resilient ring for biasing a friction plate from expanding radially outwardly and getting out of the mounting position due to centrifugal force during high-speed rotation. Two retainers having different diameters are mounted between a rotary shaft and an input gear. The large-diameter retainer is fixed to the input gear. Sprags are mounted in pockets formed in the large-diameter retainer and the small-diameter retainer. A flange and a ring groove are formed at one end of the small-diameter retainer. A friction plate arranged on one side of the flange is pressed against the flange by a resilient ring mounted in the ring groove. A restricting portion for restricting the amount of radial expansion of the resilient ring is formed on the friction plate to prevent the resilient ring from radially expanding too much due to centrifugal force during high-speed rotation.

14 Claims, 9 Drawing Sheets

TWO-WAY DIFFERENTIAL CLUTCH

BACKGROUND OF THE INVENTION

This invention relates to a two-way differential clutch using sprags.

In part-time four-wheel drive vehicles, an overrunning type two-way differential clutch is used to automatically transmit the driving force to the front vehicle wheels as soon as a rear wheel slips and the vehicle speed drops.

In unexamined Japanese patent publication 9-25959, an overrunning type two-way differential clutch using sprags is disclosed. It includes two retainers having different diameters and mounted between the outer circumferential surface of a rotary shaft and the inner circumferential surface of an input gear mounted on the rotary shaft. The large-diameter retainer is fixed to the input gear while the small-diameter one is rotatably supported on the rotary shaft so as to create a differential speed between the small-diameter retainer and the large-diameter retainer, which rotates together with the input gear, due to a frictional resistance applied to the small-diameter retainer so that sprags mounted to straddle pockets formed in both of the retainers will be inclined or tilted to a standby state in which they contact at both ends thereof the outer circumferential surface of the rotary shaft and the inner circumferential surface of the input gear. Thus, when the rotating speed of the rotary shaft drops below that of the input gear, the sprags are brought into an engaging state to transmit the rotation of the input gear to the rotary shaft.

With such a two-way differential clutch, when the rotating direction of the input gear changes over, the inclining direction of the sprags also changes automatically. Thus it is possible to transmit the rotation of the input gear in either direction to the rotary shaft.

In many cases, as a means for giving a rotational resistance to the small-diameter retainer, an arrangement is employed in which a flange is provided on the outer surface of the small-diameter retainer at its end protruding beyond one end of the input gear, a friction plate provided on one side of the flange being supported so as to be movable in the axial direction of the small-diameter retainer, and the friction plate being pressed against the flange by a partially cut-apart resilient ring supported on the small-diameter retainer.

In this two-way differential clutch, if such a resilient ring is used as a resistance-imparting means for imparting a frictional resistance to the small-diameter retainer, it may expand radially outwardly during high-speed rotation, thus coming off its position. In such a case, a frictional force between the friction plate and the flange will disappear, so that the small-diameter retainer becomes freely rotatable. The two-way differential clutch thus becomes inoperative to exhibit its function as a clutch. #

Also, for such a two-way differential clutch, since the input gear and the small-diameter retainer are rotatably supported by respective rolling bearings mounted on the rotary shaft and both ends of the rotary shaft are rotatably supported by two rolling bearings, when the clutch is assembled, an assembling step in which four rolling bearings are pressed is needed, so that it takes a long time to assemble. Thus, there is room for improvement in assembling it.

Also, after pressing, the rolling bearings need setting of clearance. At this time, since the clearance setting range is wide due to variations in e.g. tolerances of the parts at the press-in portion, it is difficult to obtain high-precision assembling. Thus, improvement in the assembling accuracy is required.

An object of this invention is to provide a two-way differential clutch which can prevent the resilient ring for biasing the friction plate from expanding radially outwardly and getting off the mounting position due to centrifugal force during high-speed rotation.

A second object of this invention is to improve assembling properties and assembling accuracy of a two-way differential clutch.

SUMMARY OF THE INVENTION

According to this invention, there is provided a two-way differential clutch comprising a rotary shaft rotatably supported by rolling bearings, an input gear rotatably supported on the rotary shaft by a rolling bearing, an output gear provided on one side of the input gear so as to be rotatable about the rotary shaft, two retainers having different diameters and mounted between an outer circumferential surface of the rotary shaft and an inner circumferential surface of the input gear one upon the other, a small-diameter one of the retainers rotatably supported by a rolling bearing mounted on the rotary shaft and a large-diameter one of the retainers mounted on the small-diameter retainer so as to rotate together with the input gear, a flange provided on the outer circumference of one end of the small-diameter retainer protruding beyond one end of the input gear, a friction plate and a partially cut-apart resilient ring provided at one side of the flange, the resilient ring pressing the friction plate against the flange, and sprags mounted to straddle pockets formed in the two retainers so as to be inclined until both ends of the sprags come into contact with an outer circumferential surface of the rotary shaft and an inner circumferential surface of the input gear by relative rotation of the small-diameter retainer and the large-diameter retainer, characterized in that the friction plate is provided with a restricting portion for restricting the amount of radial expansion of the resilient ring.

By providing the restricting portion on the friction plate, it is possible to prevent the resilient ring from radially expanding excessively due to centrifugal force. Thus, it is possible to always retain the resilient ring in the position where it presses the friction plate and to allow the two-way differential clutch to function reliably.

The restricting portion may be a cut-and-raised piece in which two rows of cuts are formed in the friction plate and the portion between the cuts is raised toward the resilient ring.

With such a two-way differential clutch, if the output gear were coupled to the rotary shaft by splines, when the input gear stops from the forward-rotation state and changes over to the reverse-rotation state, if the rotating speed of the rotary shaft, which is reversed from the wheel-side gear through the output gear, is higher than the rotating speed of the input gear, since the sprags are returned to their neutral position by contact with the rotary shaft, it is impossible to transmit the reverse rotation of the input gear to the rotary shaft.

In order to avoid such inconvenience, a torque transmission mechanism for transmitting the rotation of the rotary shaft to the output gear is provided between the rotary shaft and the output gear, a play in the rotational direction is formed in the torque transmission mechanism, the friction ring is made nonrotatable relative to the rotary shaft, the sub-gear for generating a differential speed with the rotation of the output gear and the partially cut-apart resilient ring for pressing the sub-gear against the flange provided on the outer surface of the friction ring are mounted on the friction ring, and the restricting portion for restricting the amount of radial expansion of the resilient ring is provided. By employing such an arrangement, when the rotational direction of the input gear changes, the rotary shaft is braked and decelerated due to frictional resistance acting on the contact portion between the sub-gear and the flange until the play in the torque transmission mechanism disappears. Thus, the sprags instantly engage the inner surface of the input gear and the outer surface of the rotary shaft, so that it is possible to instantly transmit the rotation of the input gear to the rotary shaft.

Also, by providing the restricting portion for restricting the amount of radial expansion of the resilient ring on the sub-gear, it is possible to prevent excessive radial expansion of the resilient ring due to centrifugal force during high-speed rotation.

According to the present invention, at least one of inner and outer raceways of the rolling bearings rotatably supporting the input gear and the small-diameter retainer is formed directly on an outer circumferential surface of the rotary shaft, an inner circumferential surface of the input gear, or an inner circumferential surface of the small-diameter retainer.

By employing such an arrangement, since at least one of the input gear and the small-diameter retainer is maintained in a state in which it has been assembled to the rotary shaft, it is possible to reduce the assembling steps of the clutch and to improve the assembling properties. Also, for at least one of the rolling bearings supporting the input gear and the small-diameter retainer, no clearance setting after mounting is necessary, so that it is possible to improve the assembling accuracy.

By integrally forming the inner raceway of one of the rolling bearings supporting both ends of the rotary shaft on the outer surface of the rotary shaft, it is possible to further improve the assembling properties and the assembling accuracy of the two-way differential clutch.

Other features and objects of the present invention will become apparent from the following description made with reference to the accompanying drawings, in which:

DETAILED DESCRIPTION OF THE PREFERRED EMBODIMENT

Figure 1:
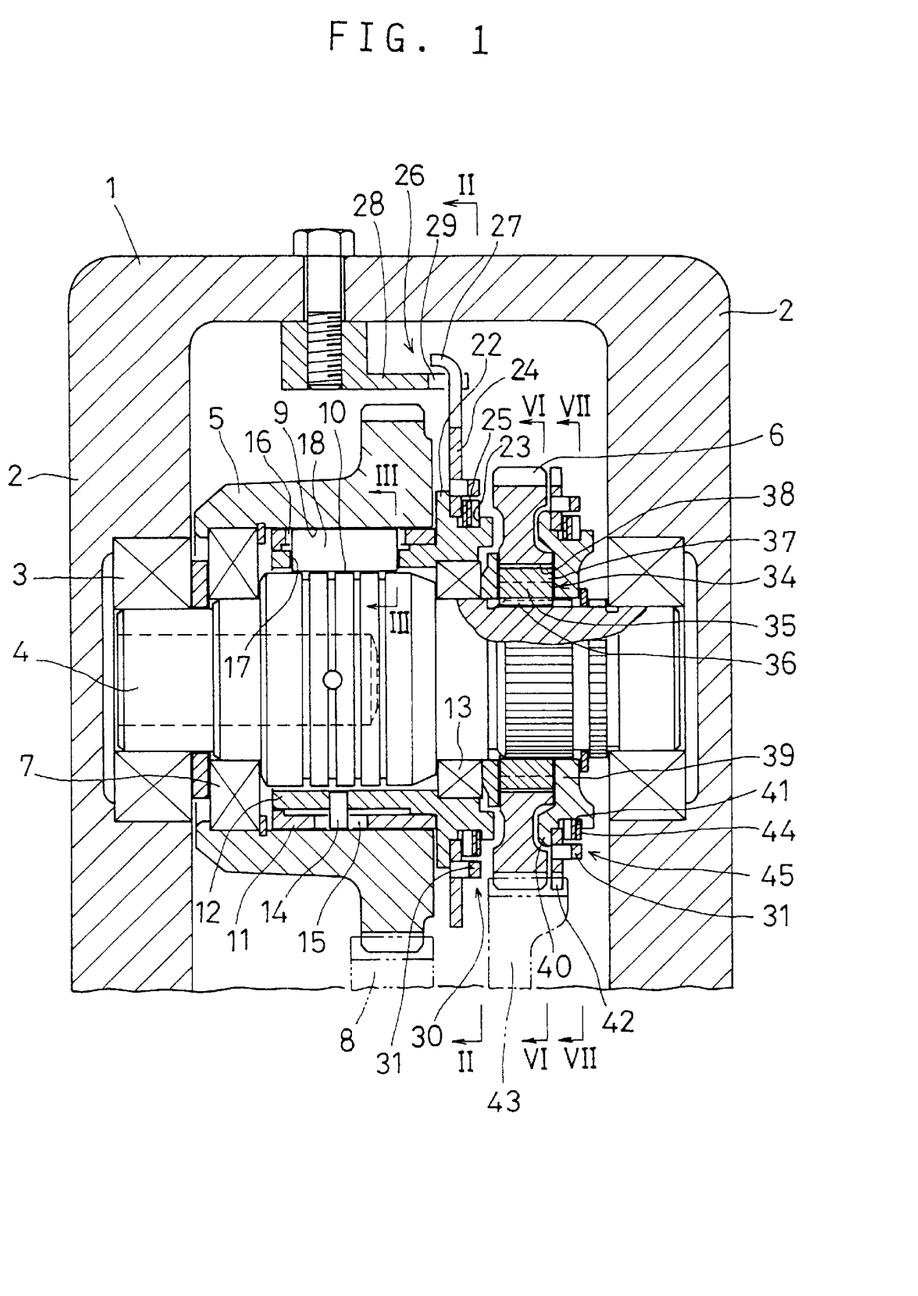
FIG. 1 is a sectional view of a two-way differential clutch according to this invention.

Hereinbelow, an embodiment of this invention is described with reference to the drawings. As shown in FIG. 1, rolling bearings 3 are mounted on opposed side walls 2 of a gear case 1. On a rotary shaft 4 having both ends thereof rotatably supported by the rolling bearings 3, an input gear 5 and an output gear 6 are mounted.

The input gear 5 is rotatably supported by a rolling bearing 7 mounted on the rotary shaft 4 and meshes with a drive gear 8. Rotation is thus transmitted through the drive gear 8 to the input gear 5.

Between a cylindrical inner surface 9 of the input gear 5 and a cylindrical outer surface 10 of the rotary shaft 4, two retainers 11, 12 having different diameters are mounted.

The large-diameter retainer 11 is fixed to the input gear 5, while the small-diameter retainer 12 is rotatably supported on the rotary shaft 4 through a rolling bearing 13. A pin 14 mounted to the small-diameter retainer 12 is inserted in a circumferentially elongated pin hole 15 formed in the large-diameter retainer 11. Within such a range that the pin 14 does not abut both ends of the pin hole 15, the large-diameter retainer 11 and the small-diameter one 12 can rotate relative to each other.

Figure 3:
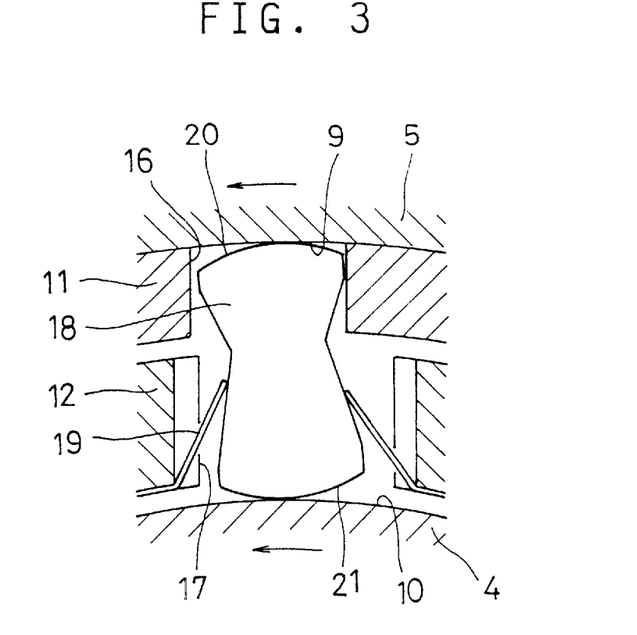
FIG. 3 is a sectional view along line III—III of FIG. 1.

The large-diameter retainer 11 and the small-diameter retainer 12 are formed with a plurality of pockets 16 and 17, respectively (FIG. 3). Sprags 18 are mounted in the radially opposed pockets 16, 17 so as to straddle them.

As shown in FIG. 3, the sprags 18 are biased from both sides by resilient members 19 mounted to the small-diameter retainer 12, and held in their neutral position in which their outer and inner cam faces 20, 21 do not engage the cylindrical inner surface 9 of the input gear 5 and the cylindrical outer surface 10 of the rotary shaft 4.

Figure 4:
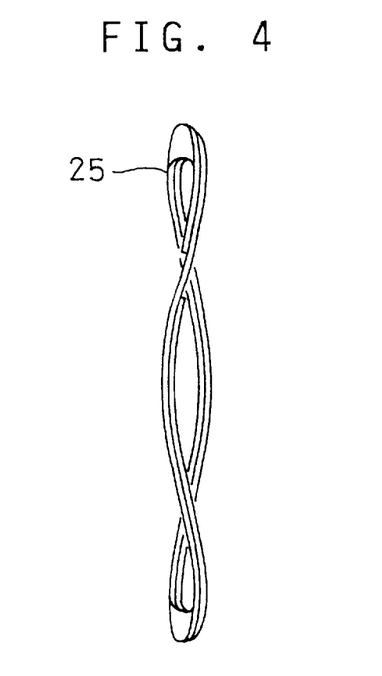
FIG. 4 is a side view of a resilient ring used in the two-way differential clutch of FIG. 1.

On the outer surface of one end of the small-diameter retainer 12, a flange 22 and a ring groove 23 are provided adjacent to each other. A friction plate 24 provided on one side of the flange 22 is pressed by a resilient ring 25 mounted in the ring groove 23 against the flange 22. As shown in FIG. 4, the resilient ring 25 is formed by winding a strip of plate having a rectangular section into a corrugated ring shape. It has both ends thereof apart from each other. The number of windings of this resilient ring may be determined in relation to the plate thickness so that a required resilience may be obtained. #

Figure 2:
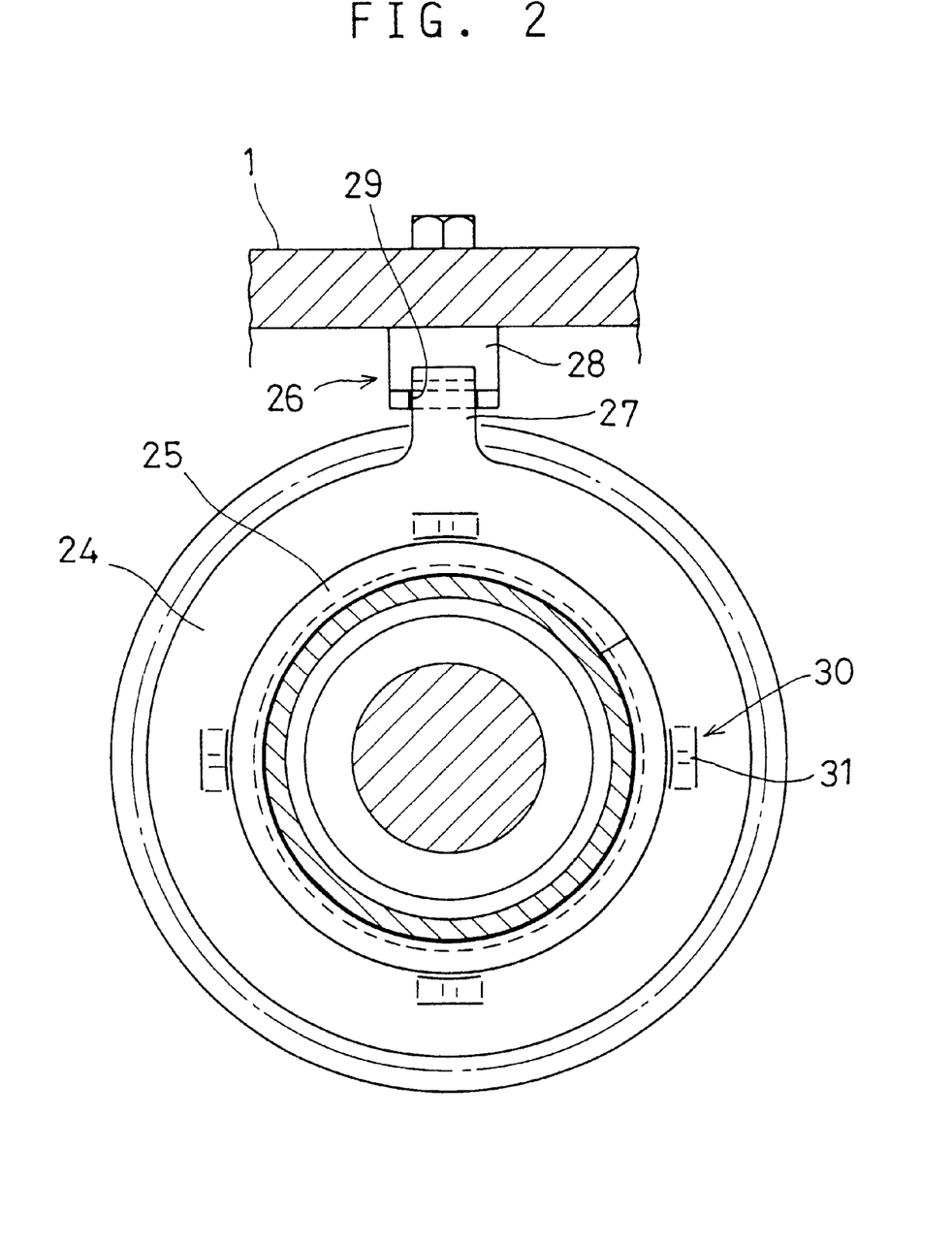
FIG. 2 is a sectional view along line II—II of FIG. 1.

The friction plate 24, as shown in FIGS. 1 and 2, is nonrotatably fixed to the gear case 1 as a fixed member by a rotation-stop mechanism 26. As the mechanism 26, a protrusion 27 provided on the peripheral surface of the friction plate 24 is engaged in a cutout 29 of an engaging plate 28 mounted to the inner surface of the gear case 1.

On the friction plate 24, restricting portions 30 are provided for preventing the resilient ring 25 from coming off the ring groove 23 by limiting the amount of radial expansion of the resilient ring 25.

Figure 5A:
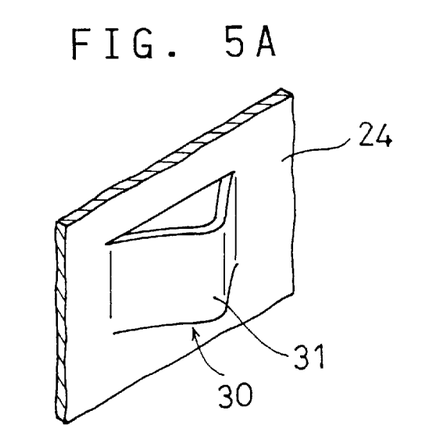
FIGS. 5A to 5C are perspective views showing examples of restricting portions formed on the friction plate of the same.
Figure 5B:
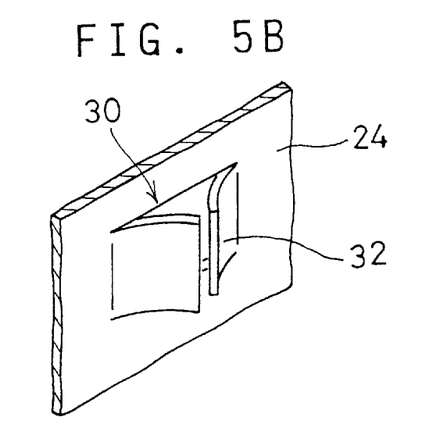
Figure 5C:
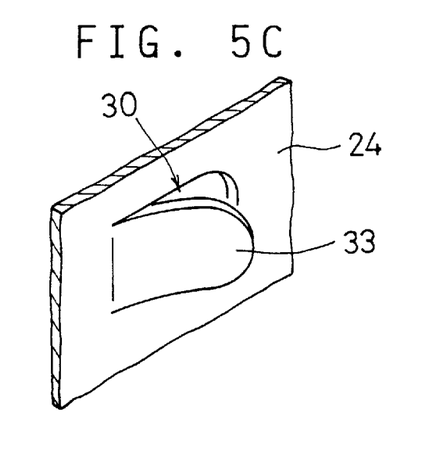

FIGS. 5A–5C show several examples of the restricting portion 30. The portion 30 shown in FIG. 5A comprises a V-shaped, cut-and-raised piece 31 formed by forming two parallel cuts in the friction plate 24 and raising the portion between the cuts to one side of the friction plate 24.

The restricting portion 30 shown in FIG. 5B comprises a pair of cut-and-raised pieces 32 formed by forming an H-shaped cut in the friction plate 24 and raising the portions defined by the cut to one side of the friction plate 24.

The restricting portion 30 shown in FIG. 5C comprises a cut-and-raised piece 33 formed by forming a U-shaped cut in the friction plate 24 and raising the portion defined by the cut to one side of the friction plate 24.

FIG. 2 shows an example in which a plurality of V-shaped cut-and-raised pieces 31 as shown in FIG. 5A are formed on the friction plate 24 at equal angular intervals. By the cut-and-raised pieces 31, the amount of radial expansion of the resilient ring 25 is restricted to prevent it from coming off the ring groove 23.

Figure 6:
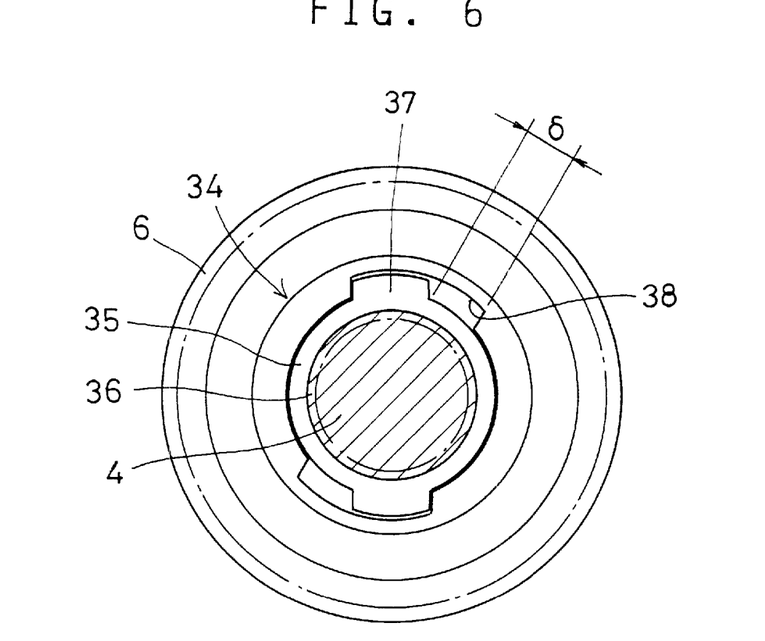
FIG. 6 is a sectional view along line VI—VI of FIG. 1.

As shown in FIGS. 1 and 6, between the rotary shaft 4 and the output gear 6, a torque transmission mechanism 34 for transmitting the rotation of the rotary shaft 4 to the output gear 6 is provided. The torque transmission mechanism 34 comprises a torque transmission ring 35 mounted between the outer circumferential surface of the rotary shaft 4 and the inner circumferential surface of the output gear 6. The torque transmission ring 35 and the rotary shaft 4 are made nonrotatable relative to each other by splines 36, and a protrusion 37 provided on the outer surface of the torque transmission ring 35 is inserted in a cutout 38 formed in the inner circumferential surface of the output gear 6 with a play δ in a rotational direction to transmit the rotation of the rotary shaft 4 to the output gear 6 by the engagement between the protrusion 37 and the end faces of the cutout 38.

On one side of the output gear 6, a friction ring 39 is provided which is nonrotatably mounted relative to the rotary shaft 4 by the splines 36.

Figure 7:
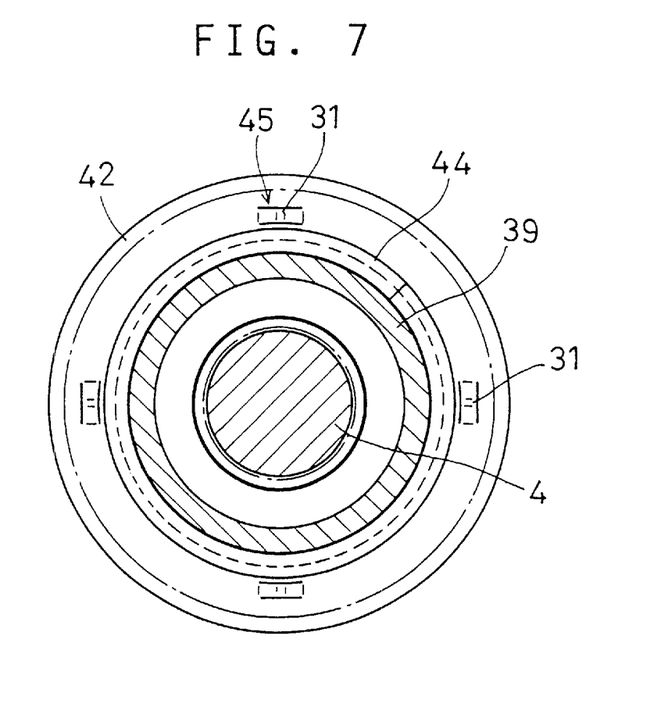
FIG. 7 is a sectional view along line VII—VII of FIG. 1.

On the outer surface of the friction ring 39, a flange 40 and a ring groove 41 are formed. On one side of the friction ring 39, a sub-gear 42 is provided, which is rotatably supported by the friction ring 39, and the number of teeth formed on the outer circumference of the sub-gear 42 is smaller than the number of teeth formed on the outer circumference of the output gear 6. The output gear 6 and the sub-gear 42 mesh with a wheel-side gear 43. When the output gear 6 and the sub-gear 42 are rotated by the wheel-side gear 43, the difference in the number of teeth causes the sub-gear 42 to rotate at a lower speed than the output gear 6.

The sub-gear 42 is pressed by a resilient ring 44 mounted in the ring groove 41 formed in the friction ring 39 against the flange 40. The resilient ring 44 has the same structure as the resilient ring 25 shown in FIG. 4, and has both ends thereof apart from each other.

The resilient ring 44 has the amount of radial expansion restricted by a restricting portion 45 formed on the sub-gear 42 to prevent it from coming out of the ring groove 41.

Since the restricting portion 45 is of the same structure as the restricting portion 30 formed on the friction plate 24 in FIG. 5, description is omitted.

Now, when rotation is transmitted from the drive gear 8 to the input gear 5, a difference in rotation speed is produced between the small-diameter retainer 12, to which is imparted a rotational resistance by the friction plate 24, and the large-diameter retainer 11 fixed to the inner circumferential surface of the input gear 5. Thus, there appears a displacement in a circumferential direction between the pockets 16 formed in the large-diameter retainer 11 and the pockets 17 formed in the small-diameter retainer 12, so that the sprags 18 mounted so as to straddle the pockets 16, 17 will incline in the direction of rotation of the input gear 5.

For example, when the input gear 5 is rotated in the direction shown by the arrow of FIG. 3, the sprags 18 will tilt leftwardly in the figure into a standby state in which the cam surfaces 20, 21 on both ends of the sprags contact the inner circumferential surface of the input gear 5 and the outer circumferential surface 10 of the rotary shaft 4, so that the clutch is established.

While a part-time four-wheel drive vehicle is travelling in a two-wheel drive mode, rotation from the front wheels (which are driven wheels) is transmitted to the rotary shaft 4, so that the rotary shaft is rotated in the same direction as the rotational direction of the input gear 5. Since its rotational speed is set to rotate faster than the input gear 5, the sprags 18 will not engage the inner circumferential surface 9 of the input gear 5 and the outer circumferential surface 10 of the rotary shaft 4, so that the rotation of the input gear 5 is not transmitted to the rotary shaft 4.

When a driving wheel of the four-wheel drive vehicle slips and the rotational speed of the driven wheels drops or they stop, so that the rotational speed of the rotary shaft 4 rotated by the transmission of rotation from the driven wheels drops below the rotational speed of the input gear 5, the sprags 18 will engage the inner surface of the input gear 5 and the outer surface of the rotary shaft 4, so that the rotation of the input gear 5 is transmitted to the rotary shaft 4. The rotation of the rotary shaft 4 is transmitted through the torque transmission mechanism 34 to the output gear 6, so that the driven wheels are driven.

In this state, when the moving direction of the vehicle is changed over, the input gear 5 is stopped and then turned in a reverse direction, so that due to a rotational speed difference between the large-diameter retainer 11 and the small-diameter retainer 12, the sprags 18 will be tilted in the reverse direction to the state shown in FIG. 3, into contact with the inner circumferential surface 9 of the input gear 5 and the outer circumferential surface 10 of the rotary shaft 4. In this state, if the rotational speed of the rotary shaft 4 is faster than that of the input gear 5, the sprags 18 do not engage the inner circumferential surface 9 and the outer circumferential surface 10, so that the rotation of the input gear 5 is not transmitted to the rotary shaft 4.

But when due to a change in the rotational direction, the output gear 6 and the sub-gear 42 are rotated from the wheel-side gear 43, a difference in the number of teeth between the gears 6 and 42 causes the sub-gear 42 to rotate at a lower speed than the output gear 6. At this time, since the sub-gear 42 is pressed against the flange 40 by the resilient ring 44, the rotary shaft 4 is braked, so that its speed becomes lower than the rotational speed of the input gear 5 by the time the play δ of the torque transmission mechanism 34 disappears.

Thus, the sprags 18 will engage the inner circumferential surface 9 and the outer circumferential surface 10 and the clutch is established, so that the rotation of the input gear 5 is transmitted to the rotary shaft 4 through the sprags 18.

In other words, when the rotational direction of the input gear 5 is changed over, since the rotary shaft 4 is decelerated by the frictional resistance acting on the contact portions of the sub-gear 42 and the flange 40, the two-way differential clutch will operate instantly.

When the speed of the vehicle increases, the rotational speeds of the small-diameter retainer 12 and the friction ring 39 also increase, so that the resilient ring 25 mounted in the ring groove 23 of the small-diameter retainer 12 and the resilient ring 44 mounted in the ring groove 41 of the friction ring 39 tend to expand radially outwardly. #

At this time, since the resilient rings 25, 44 are restrained from expanding by the restricting portions 30, 45 formed on the friction plate 24 and the sub-gear 42, respectively, they are prevented from expanding too much.

Thus, there will be no possibility of the resilient rings 25, 44 coming out of the ring grooves 23, 41, so that the two-way differential clutch can always perform the differential function reliably. #

For the two-way differential clutch, a pair of rolling bearings 3 for rotatably supporting both ends of the rotary shaft 4, a rolling bearing 7 for rotatably supporting the input gear 5, and a rolling bearing 13 for rotatably supporting the small-diameter retainer 12, a total of four rolling bearings are used. If these rolling bearings were mounted by pressing when the two-way differential clutch was assembled, the clutch would be time-consuming to assemble and the mounting accuracy would be worse.

In order to avoid such inconvenience, the structure shown in FIGS. 8 through 11 is employed. With the two-way differential clutch shown in FIG. 8, the outer raceway 7a of the rolling bearing 7 rotatably supporting the input gear 5 relative to the rotary shaft 4, and the outer raceway 13a of the rolling bearing 13 rotatably supporting the small-diameter retainer 12 relative to the rotary shaft 4 are formed directly on the inner circumferential surface of the input gear 5 and that of the small-diameter retainer 12, respectively, to omit outer rings of the bearings.

Figure 8:
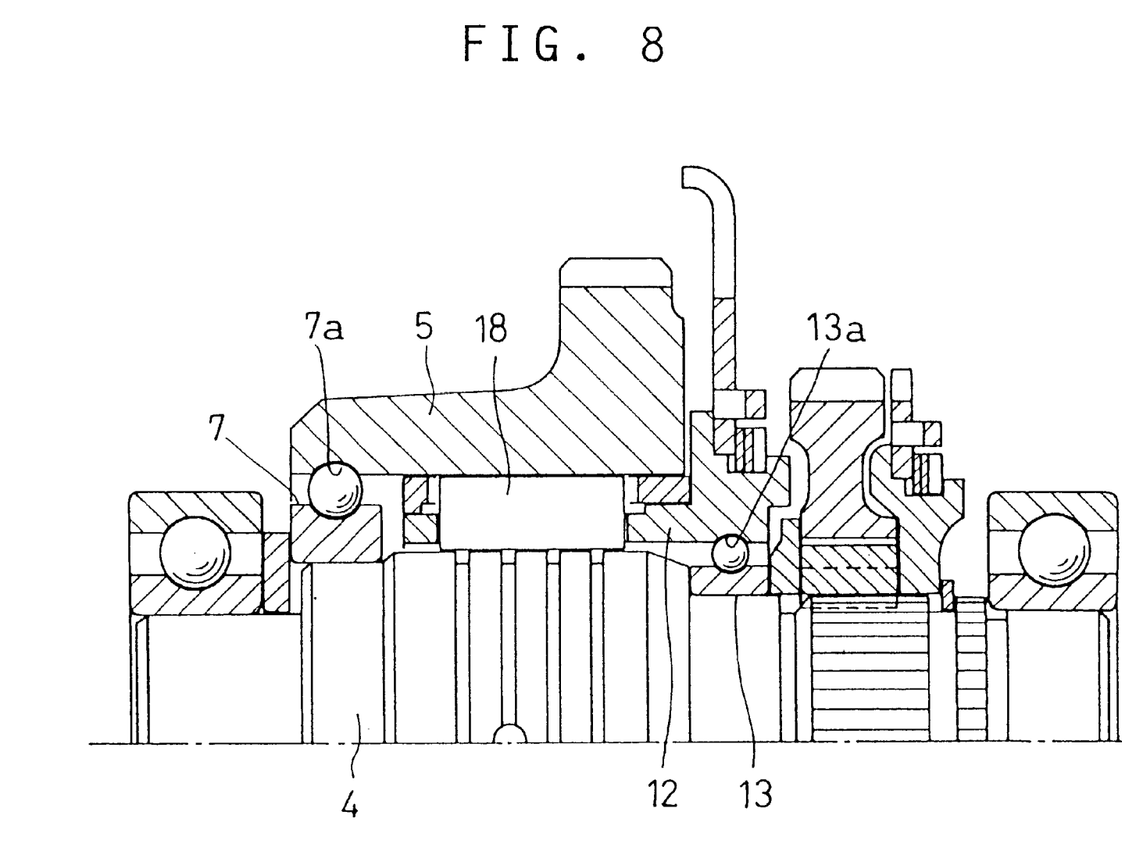
FIG. 8 is an enlarged sectional view of the two-way differential clutch shown in FIG. 1.

By directly forming the outer raceways 7a, 13a of the rolling bearings 7, 13 on the inner surface of the input gear 5 and that of the small-diameter retainer 12, the input gear 5 and the small-diameter retainer 12 are retained in an assembled state on the rotary shaft 4 through the rolling bearings 7, 13.

Thus, when the two-way differential clutch is assembled, it is possible to eliminate the necessity of mounting the input gear 5 and the small-diameter retainer 12 by pressing the rolling bearings 7 and 13. This improves the assembling properties of the two-way differential clutch. Also, it is possible to eliminate the necessity of setting clearance of the rolling bearings 7, 13 after the two-way differential clutch has been assembled. Thus the assembling accuracy also improves.

Figure 9:
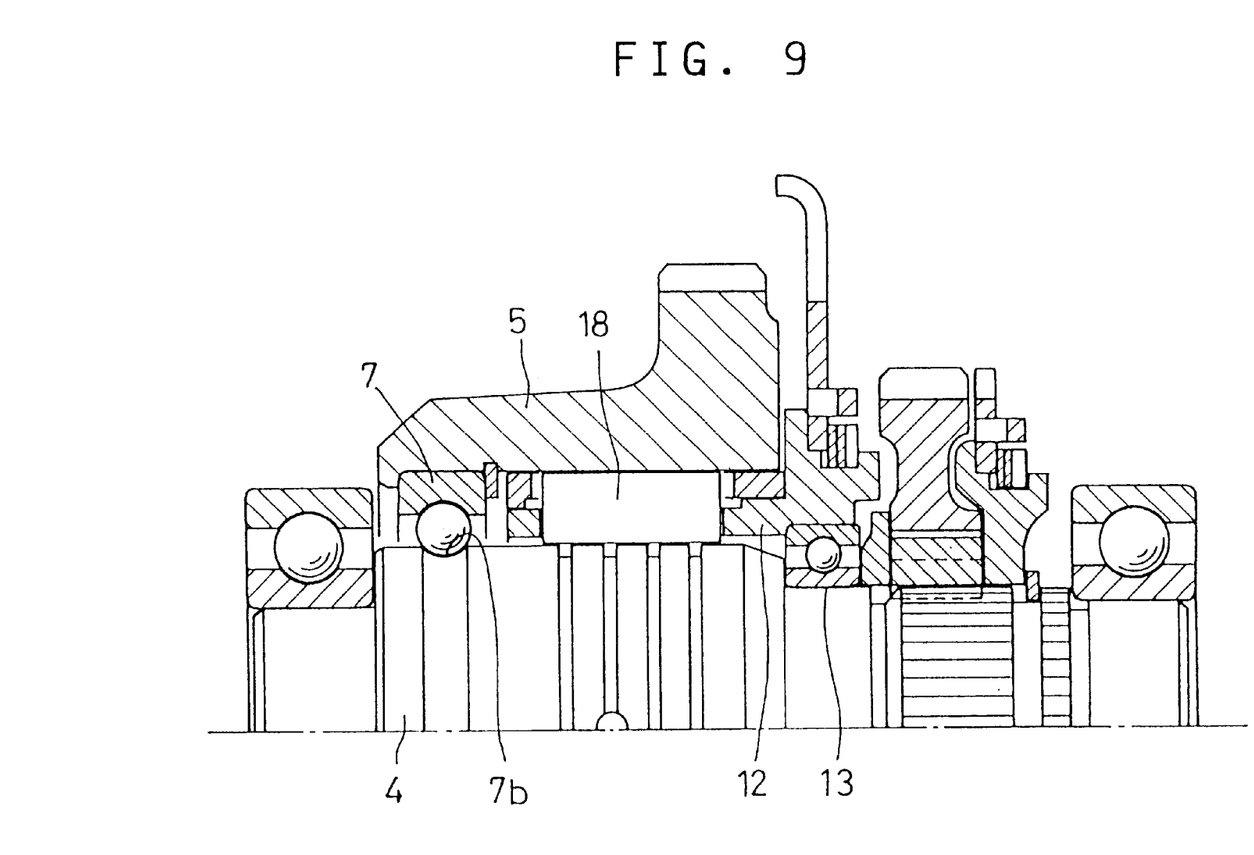
FIGS. 9–11 are sectional views of other embodiments.

In the embodiment shown in FIG. 9, the inner raceway 7b of the rolling bearing 7 rotatably supporting the input gear 5 on the rotary shaft 4 is directly formed on the outer circumferential surface of the rotary shaft 4.

Figure 10:
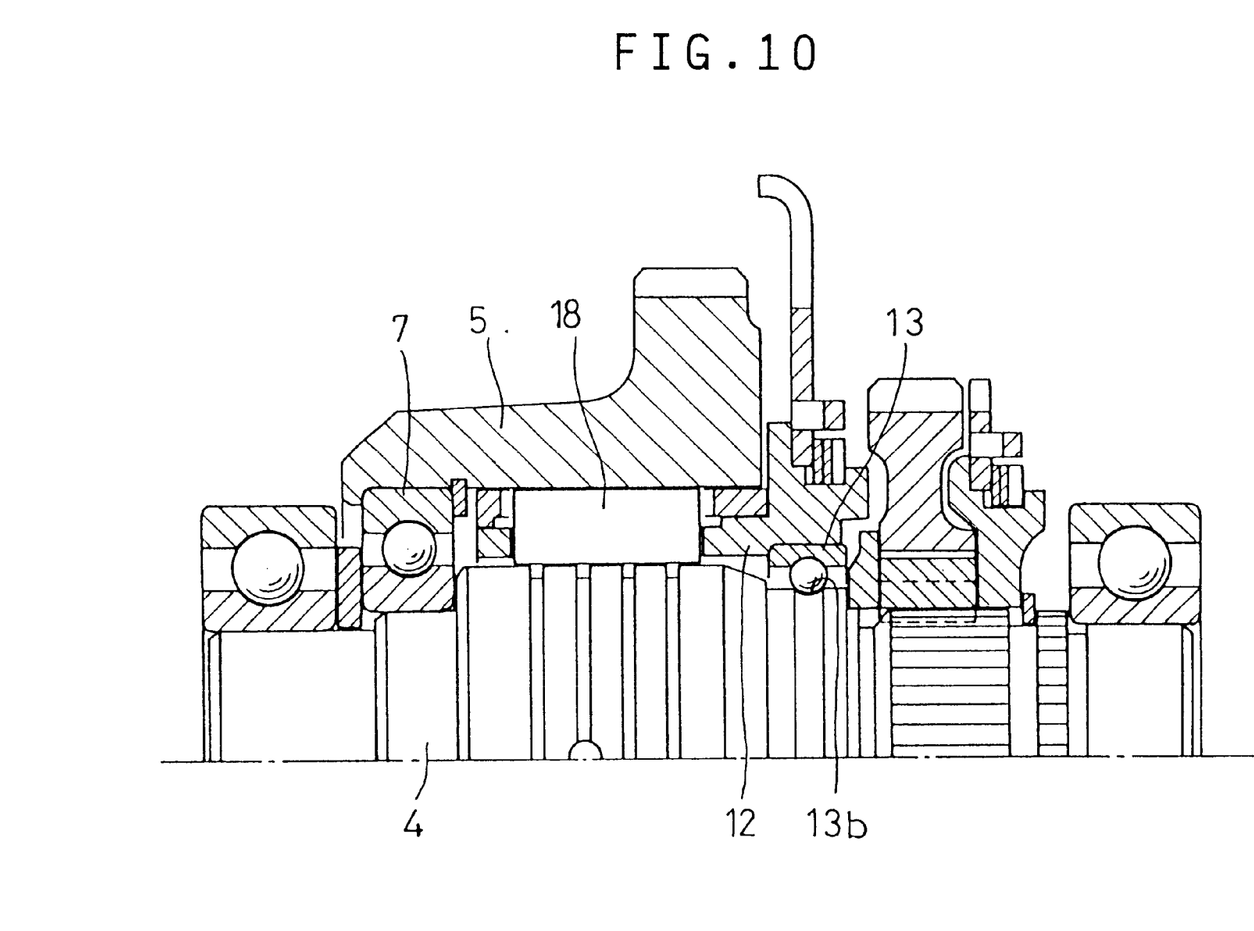

In the embodiment shown in FIG. 10, the inner raceway 13b of the rolling bearing 13 rotatably supporting the small-diameter retainer 12 on the rotary shaft 4 is directly formed on the outer circumferential surface of the rotary shaft 4.

In any of the above-described two-way differential clutches, when compared with a two-way differential clutch of the type in which the respective rolling bearings are pressed in, it is possible to improve the assembling properties and accuracy.

Although not shown in the figures, the inner raceway 7b of the rolling bearing 7 rotatably supporting the input gear 5, and the inner raceway 13b of the rolling bearing 13 rotatably supporting the small-diameter retainer 12 may be directly formed on the outer circumferential surface of the rotary shaft 4.

Figure 11:
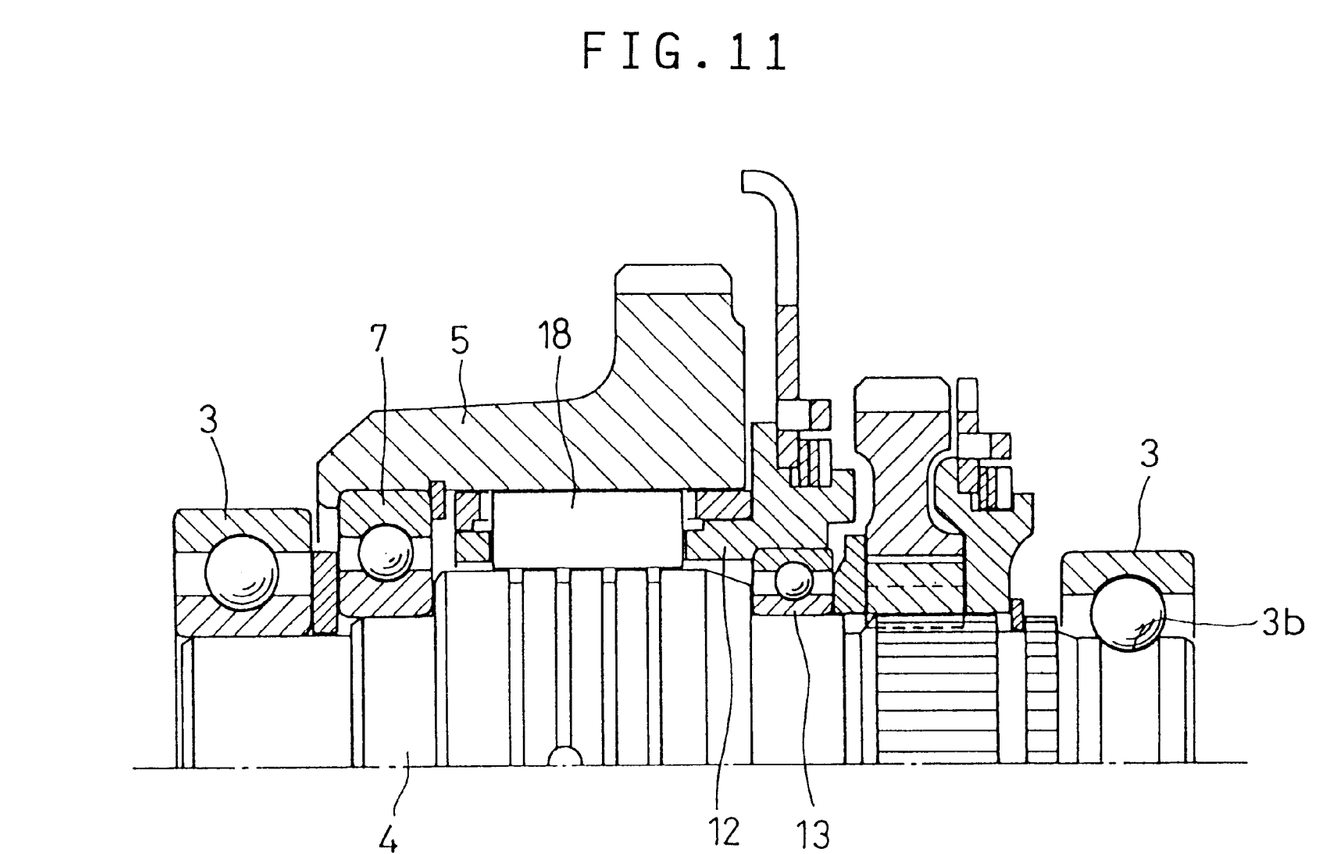

In the embodiment shown in FIG. 11, the inner raceway 3b of one of the rolling bearings 3 rotatably supporting the rotary shaft 4 on the housing 1 is formed on the outer circumferential surface of the rotary shaft 4. By employing this bearing structure in the two-way differential clutch shown in FIGS. 8 through 10, it is possible to further improve the assembling property and accuracy.

As described above, according to this invention, by providing the friction plates with the restricting portions for restricting the amount of radial expansion of the resilient rings, it is possible to prevent the resilient rings from expanding excessively and coming out of the small-diameter retainer. Thus it is possible to prevent the trouble of the two-way differential clutch becoming inoperative.

Also, by providing the restricting portions in the form of cut-and-raised protruding pieces, it is possible to prevent an increase in the weight. #

Further, according to the present invention, the torque transmission mechanism is provided which has a play in the rotational direction between the output gear and the rotary shaft, the sub-gear which produces a differential speed with the rotation of the output gear is provided on the outer circumference of the friction ring which rotates together with the rotary shaft, and the sub-gear is pressed against the flange provided on the outer circumference of the friction ring by the resilient ring to give the rotary shaft a rotational resistance. With this arrangement, when the rotary shaft stops after forward rotation and then rotates in a reverse direction, braking force is applied to the rotary shaft, so that its rotational speed becomes lower than that of the input gear. Thus, the two-way differential clutch can be instantly brought to an operative state.

According to this invention, since at least one of the inner and outer raceways of the two rolling bearings rotatably supporting the input gear and the small-diameter retainer is formed directly on the outer circumferential surface of the rotary shaft, the inner circumferential surface of the input gear, or the inner circumferential surface of the small-diameter retainer, it is possible to improve the assembling property and accuracy by reducing the number of assembling steps for the two-way differential clutch.

What is claimed is:

1. A two-way differential clutch comprising a rotary shaft rotatably supported by rolling bearings, an input gear rotatably supported on said rotary shaft by a rolling bearing, an output gear provided on one side of said input gear so as to be rotatable about said rotary shaft, two retainers having different diameters and mounted between an outer circumferential surface of said rotary shaft and an inner circumferential surface of said input gear one upon the other, a small-diameter one of said retainers rotatably supported by a rolling bearing mounted on said rotary shaft and a large-diameter one of said retainers mounted on said small-diameter retainer so as to rotate together with said input gear, a flange provided on the outer circumference of one end of said small-diameter retainer protruding beyond one end of said input gear, a friction plate and a partially cut-apart resilient ring provided at one side of said flange, said resilient ring pressing said friction plate against said flange, and sprags mounted to straddle pockets formed in said two retainers so as to be inclined until both ends of said sprags come into contact with an outer circumferential surface of said rotary shaft and an inner circumferential surface of said input gear by relative rotation of said small-diameter retainer and said large-diameter retainer, characterized in that said friction plate is provided with a restricting portion for restricting the amount of radial expansion of said resilient ring.

2. The two-way differential clutch as claimed in claim 1 characterized in that said restricting portion is a cut-and-raised piece.

3. The two-way differential clutch as claimed in claim 1 further comprising a torque transmission mechanism provided between said rotary shaft and said output gear for transmitting the rotation of said rotary shaft to said output gear, a play in a rotational direction being formed in said torque transmission mechanism, a friction ring provided on one side of said output gear so as to be nonrotatable relative to said rotary shaft, a sub-gear for producing a differential speed with the rotation of said output gear and a second partially cut-apart resilient ring for pressing said sub-gear against a flange formed on the outer circumference of said friction ring, said sub-gear and said second resilient ring being mounted on the outer circumference of said friction ring, and a restricting portion provided on said sub-gear for restricting the amount of radial expansion of said second resilient ring.

4. The two-way differential clutch as claimed in claim 3 wherein said restricting portion provided on said sub-gear is a cut-and-raised piece.

5. The two-way differential clutch as claimed claim 1 wherein at least one of inner and outer raceways of said rolling bearings rotatably supporting said input gear and said small-diameter retainer is formed directly on an outer circumferential surface of said rotary shaft, an inner circumferential surface of said input gear, or an inner circumferential surface of said small-diameter retainer.

6. The two-way differential clutch as claimed in claim 1 wherein inner raceways of said rolling bearings supporting said rotary shaft are formed directly on an outer circumferential surface of said rotary shaft.

7. The two-way differential clutch as claimed in claim 2 further comprising a torque transmission mechanism provided between said rotary shaft and said output gear for transmitting the rotation of said rotary shaft to said output gear, a play in a rotational direction being formed in said torque transmission mechanism, a friction ring provided on one side of said output gear so as to be nonrotatable relative to said rotary shaft, a sub-gear for producing a differential speed with the rotation of said output gear and a second partially cut-apart resilient ring for pressing said sub-gear against a flange formed on the outer circumference of said friction ring, said sub-gear and said second resilient ring being mounted on the outer circumference of said friction ring, and a restricting portion provided on said sub-gear for restricting the amount of radial expansion of said second resilient ring.

8. The two-way differential clutch as claimed in claim 2 wherein at least one of inner and outer raceways of said rolling bearings rotatably supporting said input gear and said small-diameter retainer is formed directly on an outer circumferential surface of said rotary shaft, an inner circumferential surface of said input gear, or an inner circumferential surface of said small-diameter retainer.

9. The two-way differential clutch as claimed in claim 3 wherein at least one of inner and outer raceways of said rolling bearings rotatably supporting said input gear and said small-diameter retainer is formed directly on an outer circumferential surface of said rotary shaft, an inner circumferential surface of said input gear, or an inner circumferential surface of said small-diameter retainer.

10. The two-way differential clutch as claimed in claim 4 wherein at least one of inner and outer raceways of said rolling bearings rotatably supporting said input gear and said small-diameter retainer is formed directly on an outer circumferential surface of said rotary shaft, an inner circumferential surface of said input gear, or an inner circumferential surface of said small-diameter retainer.

11. The two-way differential clutch as claimed in claim 2 wherein inner raceways of said rolling bearings supporting said rotary shaft are formed directly on an outer circumferential surface of said rotary shaft.

12. The two-way differential clutch as claimed in claim 3 wherein inner raceways of said rolling bearings supporting said rotary shaft are formed directly on an outer circumferential surface of said rotary shaft.

13. The two-way differential clutch as claimed in claim 4 wherein inner raceways of said rolling bearings supporting said rotary shaft are formed directly on an outer circumferential surface of said rotary shaft.

14. The two-way differential clutch as claimed in claim 5 wherein inner raceways of said rolling bearings supporting said rotary shaft are formed directly on an outer circumferential surface of said rotary shaft.

* * * * *